(12) United States Patent
Knowles et al.

(10) Patent No.: US 6,910,631 B2
(45) Date of Patent: *Jun. 28, 2005

(54) WEB-ENABLED SYSTEM AND METHOD FOR DESIGNING AND MANUFACTURING BAR CODE SCANNERS

(75) Inventors: Carl Harry Knowles, Moorestown, NY (US); Leroy Dickson, Morgan Hill, CA (US); Thomas Amundsen, Turnersville, NJ (US); John Groot, San Jose, CA (US); Thomas Carullo, Marlton, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 80 days.

This patent is subject to a terminal disclaimer.

(21) Appl. No.: 10/308,206

(22) Filed: Dec. 2, 2002

(65) Prior Publication Data

US 2003/0213846 A1 Nov. 20, 2003

Related U.S. Application Data

(63) Continuation of application No. 09/571,263, filed on May 15, 2000, now Pat. No. 6,540,140, which is a continuation of application No. 09/319,684, filed as application No. PCT/US98/09692 on May 12, 1998, now Pat. No. 6,182,897, which is a continuation-in-part of application No. 08/854,832, filed on May 12, 1997, now Pat. No. 6,085,978.

(51) Int. Cl.[7] .............................................. G06K 7/10
(52) U.S. Cl. ........................... 235/462.01; 235/462.25; 235/472.01
(58) Field of Search ................... 235/462.01–462.47, 235/472.01, 472.02, 472.03, 454, 455, 470, 375, 383, 381

(56) References Cited

U.S. PATENT DOCUMENTS

| | | | | |
|---|---|---|---|---|
| 4,415,224 A | * | 11/1983 | Dickson | 359/18 |
| 4,675,531 A | * | 6/1987 | Clark et al. | 250/568 |
| 5,206,491 A | * | 4/1993 | Katoh et al. | 235/462.4 |
| 5,581,067 A | * | 12/1996 | Grosfeld et al. | 235/462.36 |
| 5,640,193 A | * | 6/1997 | Wellner | 725/100 |
| 5,763,863 A | * | 6/1998 | Grosfeld et al. | 235/462.36 |
| 5,905,248 A | * | 5/1999 | Russell et al. | 235/462.15 |
| 5,918,213 A | * | 6/1999 | Bernard et al. | 705/26 |
| 6,161,758 A | * | 12/2000 | Collins et al. | 235/462.01 |
| 6,182,897 B1 | * | 2/2001 | Knowles et al. | 235/462.01 |
| 6,195,053 B1 | * | 2/2001 | Kodukula et al. | 343/702 |
| 6,540,140 B1 | * | 4/2003 | Knowles et al. | 235/462.01 |

OTHER PUBLICATIONS

Int'l Search Report for PCT/US98/09692, 1998.

* cited by examiner

*Primary Examiner*—Thien M. Le
(74) *Attorney, Agent, or Firm*—Thomas J. Perkowski, Esq., P.C.

(57) ABSTRACT

An Internet enabled method and system (1) for designing, and manufacturing laser scanners of modular design and construction (231) using globally based information networks (3), such as the Internet, supporting the World Wide Web (www).

18 Claims, 9 Drawing Sheets

| MODULES AND SUBCOMPONENTS FOR HOLOGRAPHIC LASER SCANNER DESIGN "A" | | | | | |
|---|---|---|---|---|---|
| MODULES | M1A<br>OPTICAL BENCH /<br>HOUSING MODULE | M2A<br>HOLOGRAPHIC<br>SCANNING DISC/<br>PHOTODETECTOR<br>MODULE | M3A<br>SCANNING STATION<br>MODULE | M4A<br>CPU BOARD/ POWER<br>SUPPLY MODULE | |
| SUBCOMPONENTS | M1A1<br>OPTICAL BENCH | M2A1<br>SCANNING DISC<br>PLATES (8.6") | M3A1<br>SCANNING STATION<br>SUPPORT FIXTURE | M4A1<br>CPU MOTHER-BOARD | |
| | M1A2<br>HOUSING COVER | M2A2<br>SCANNER MOTOR | M3A2<br>BEAM FOLDING<br>MIRROR | M4A2<br>POWER SUPPLY<br>MODULE | |
| | M1A3<br>HOUSING SIDE<br>WALLS | M2A3<br>MOTOR SUPPORT<br>FIXTURE | M3A3<br>PARABOLIC LIGHT<br>COLLECTING MIRROR | M4A3<br>WIRE HARNESSES | |
| | | M2A4<br>PHOTODETECTOR<br>BOARDS (3) | M3A4<br>LASER BEAM<br>PRODUCTION MODULE | | |
| | | M2A5<br>PHOTODETECTOR<br>COVER PLATE | M3A5<br>ANALOG SIGNAL<br>PROCESSING BOARD | | |

FIG. 9

WEB-ENABLED SYSTEM AND METHOD FOR DESIGNING AND MANUFACTURING BAR CODE SCANNERS

RELATED CASES

This Application is a Continuation of application Ser. No. 09/571,263 filed May 15, 2000, now U.S. Pat No. 6,540,140; which is a continuation of application Ser. No. 09/319,684 filed Jun. 9, 1999, now U.S. Pat. No. 6,182,897; which is a National Phase Entry Application of International Application PCT/US98/09692 filed May 12, 1998; which is a Continuation-in-Part of U.S. patent application Ser. No. 08/854,832 filed May 12, 1997, now U.S. Pat. No. 6,085,978.

BACKGROUND OF THE INVENTION

1. Field of Invention

The present invention relates generally to laser scanners of modular design and construction, and more particularly to a novel method and system for designing and manufacturing the same using globally-based information networks, such as the Internet, supporting the World Wide Web (WWW).

2. Brief Description of the Prior Art

Laser bar code scanners are used in many fields of endeavor for diverse purposes, namely: data entry; automatic product/object detection; information retrieval; and the like.

Typically, laser bar code scanning systems are acquired by end-users only after the scanning requirements of their applications have been determined. In most instances, bar code scanning requirements are specified by: the resolution of the smallest bar code expected to be scanned; the speed at which bar codes are expected to move within the scanning field (or volume); the depth of the scanning field (or volume) required by the application; and the dimensions of the scanning field (or volume) required by the application.

Once the scanning requirements have been specified for the application at hand, the end-user can then either: (1) find a manufacturer which sells a laser scanning system that satisfies the specified scanning requirements; or (2) find a manufacturer willing to custom manufacture a laser scanning system that satisfies the specified scanning requirements and in quantities required by the end-user.

While such methods of laser scanner procurement have been adopted by virtually all end-users, such methods suffer from a number of shortcomings and drawbacks.

In particular, the first method of scanner procurement typically results in the end-user acquiring a laser scanning system that is non-optimally matched to the end-user specified scanning requirements in terms of both cost and performance.

The second method of scanner procurement is typically available to only those end-users who are in a position to purchase large quantities of a particular scanner design. Consequently, for end-users having small purchase order requirements, the first method of scanner procurement is typically the only method available to such customers.

Thus, there is a great need in the laser scanning art for an improved method and system of designing, constructing and delivering custom-configured laser scanning systems to end-users, while avoiding the shortcomings and drawbacks of prior art systems and methodologies.

DISCLOSURE OF THE INVENTION

Accordingly, a primary object of the present invention is to provide an improved method and system of designing, constructing and delivering custom-configured laser scanning systems to end-users, while avoiding the shortcomings and drawbacks of prior art systems and methodologies.

A further object of the present invention is to provide a novel method for designing and manufacturing laser scanners using end-user specified scanning requirements and modularized subcomponents and subassemblies.

A further object of the present invention is to provide a novel system for designing and manufacturing laser scanners using end-user specified scanning requirements and modularized subcomponents and subassemblies.

A further object of the present invention is to provide a Internet (i.e. Web) enabled system for designing, manufacturing and delivering custom-designed laser scanners of modularized design and construction.

A further object of the present invention is to provide such a Web-enabled system, wherein end-users desiring to purchase a laser scanning system for a particular application (1) transmit their end-user scanning requirements to a Scanner Design/Manufacturing Website, during an interactive procedure using a conventional Web browser program, and in response thereto, the system (2) assigns a unique customer request number to the input scanner requirements, (3) computes a price quotation (based thereon), and thereafter (4) transmits the same back to an e-mail address specified by the end-user (customer).

A further object of the present invention is to provide such a Web-enabled system, wherein an electronic commerce server, supporting secured credit-card transactions and the like, enables (1) the manufacturer to confirm the user-specified scanning system on which a particular quote was transmitted, (2) the customer (e.g. end-user, value-added reseller, etc.) to electronically place a purchase order on the particular system, and thereafter (3) the customer to track the progress of the ordered system during its various stages of manufacture (via a Web-site) maintained by the manufacturer.

A further object of the present invention is to provide such a Web-enabled system, wherein end-user scanning requirements are satisfied by a holographic laser scanning system design comprising modularized subcomponents and subassemblies.

A further object of the present invention is to provide a novel holographic laser scanning system comprised of modularized subcomponents and subassemblies custom manufactured and/or configured using the globally-extensive system of the present invention.

These and other objects of the present invention will become apparent hereinafter and in the claims to Invention.

BRIEF DESCRIPTION OF THE DRAWINGS

In order to more fully understand the objects of the present invention, the following Detailed Description of the Best Mode Embodiments of the Present Invention should be read in conjunction with the accompanying Figure Drawings in which:

FIG. 9 is a schematic representation of an information display structure used to display information models of modules and subcomponents from the Inventory Library and the Design Library of the system during the design of the modularized holographic laser scanners according to the principles of the present invention.

DETAILED DESCRIPTION OF THE BEST MODE EMBODIMENTS OF THE PRESENT INVENTION

Referring to the figures in the accompanying Drawings, the method and system for designing and manufacturing laser scanning systems of modular design and construction will be described in great detail.

Figure 1:
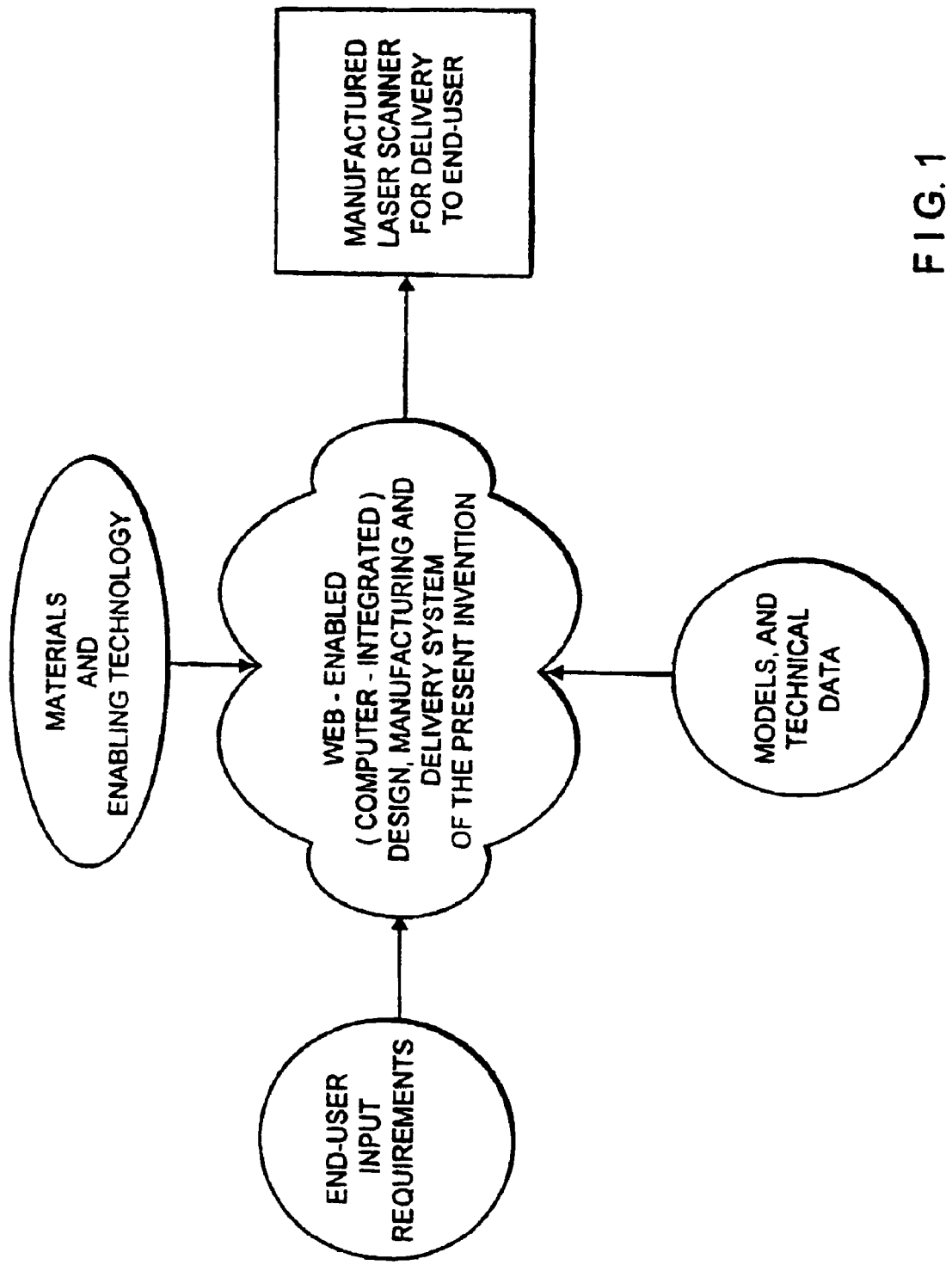
FIG. 1 is a schematic representation illustrating the high-level operations carried out by the Web-enabled system and method of laser scanner design, manufacture and delivery in accordance with the principles of the present invention.

As shown in FIG. 1, the system of the preferred embodiment is implemented over a globally-based information network, such as the Internet supporting the World Wide Web using hypertext transmission protocol (HTTP) and the hypertext markup language (HTML) well known in the art. The infrastructure of the Internet, HTTP, HTML, Web clients and Web servers are described in detail in the following International Applications: International Application No. PCT/US97/21975, entitled "SYSTEM AND METHOD FOR ACCESSING INTERNET-BASED INFORMATION RESOURCES BY SCANNING JAVA-APPLET ENCODED BAR CODE SYMBOLS," filed Nov. 24, 1997; International Application No. PCT/US97/21443. entitled "SYSTEM AND METHOD FOR CARRYING OUT INFORMATION-RELATED TRANSACTIONS USING WEB DOCUMENTS EMBODYING TRANSACTION-ENABLING APPLETS AUTOMATICALLY LAUNCHED AND EXECUTED TO READING URL-ENCODED SYMBOLS," filed Nov. 24, 1997; and International Application No.: PCT/US97/21970, entitled "BAR CODE SYMBOL DRIVEN SYSTEMS FOR ACCESSING INFORMATION RESOURCES ON THE INTERNET" filed Nov. 24, 1997, each being incorporated herein by reference.

Figure 2:
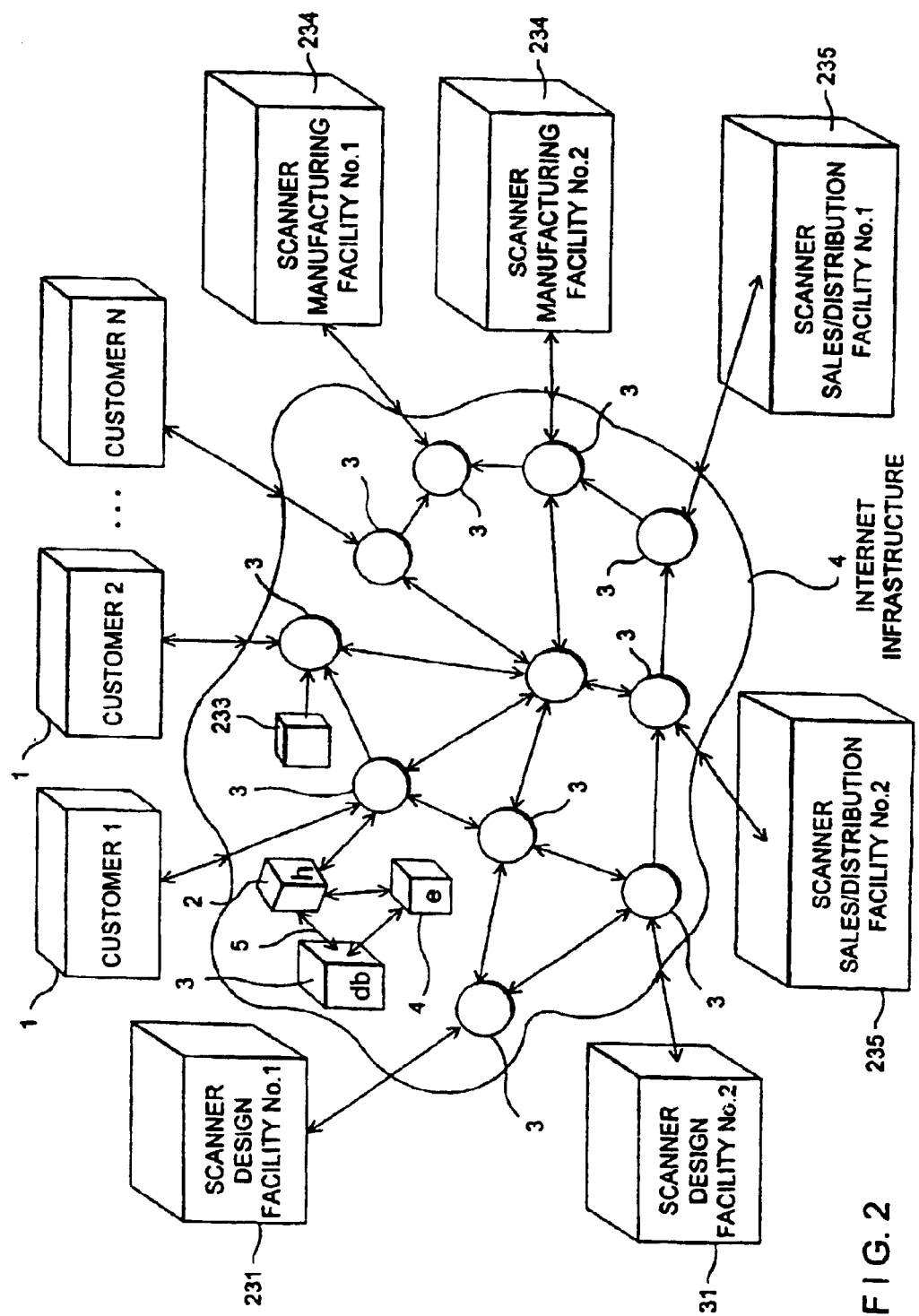
FIG. 2 is a schematic representation of the Web-enabled system for designing, manufacturing and delivering custom-built laser scanners in accordance with the principles of the present invention.

As indicated in FIGS. 1 and 2, the end-user (e.g. customer), considering the purchase of a laser scanning system, with a particular application in mind, uses a Web-enabled client computer system 1 in order to visit the Manufacturer's Web-site which is designed to support the specification, purchase, manufacture and delivery of custom-built laser scanners in accordance with the method of the present invention. The manufacturer's Web-site can be hosted upon any suitable Internet (i.e. HTTP) Server 2 running HTTP, with a TCP/IP link to an Internet Service Provider (ISP) 3 connected to the infrastructure of the Internet 4. As shown in FIG. 2, a back-end Database System 3 and an Electronic Commerce Server 4 are interfaced with the Internet Server 2 by way of a high-speed local area network (LAN), situated behind a secure firewall constructed in a manner known in the art. As will be explained in greater detail hereinafter, the function of the Database Server 3 is to support the automated generation of complete models (i.e. optical, engineering, 3-D graphical, cost, production and like models) for modularized laser-based scanning systems in response to scanning requirements provided to the Manufacturer's Web site by end-users (e.g. prospective customers). The function of the Electronic Commerce Server 4 is to support secured credit-card transactions and the like for the purchase of a designed laser scanning system on which a particular quote was computed and transmitted by the Database Server 3.

In accordance with the principles of the present invention, the Manufacturer's Web site should include a collection of HTML Forms, and one or more CGI scripts, particularly designed to cooperate with the back-end (web-enabled) Database System 3 and Web-enabled client systems 1 remotely situated anywhere in the world having Internet access. Preferably, the back-end Database System 3 is constsructed/programmed to support the automated generation of a complete model of laser scanning systems capable of satisfying the specified scanning requirements of a wide range of end-users.

Figure 3:
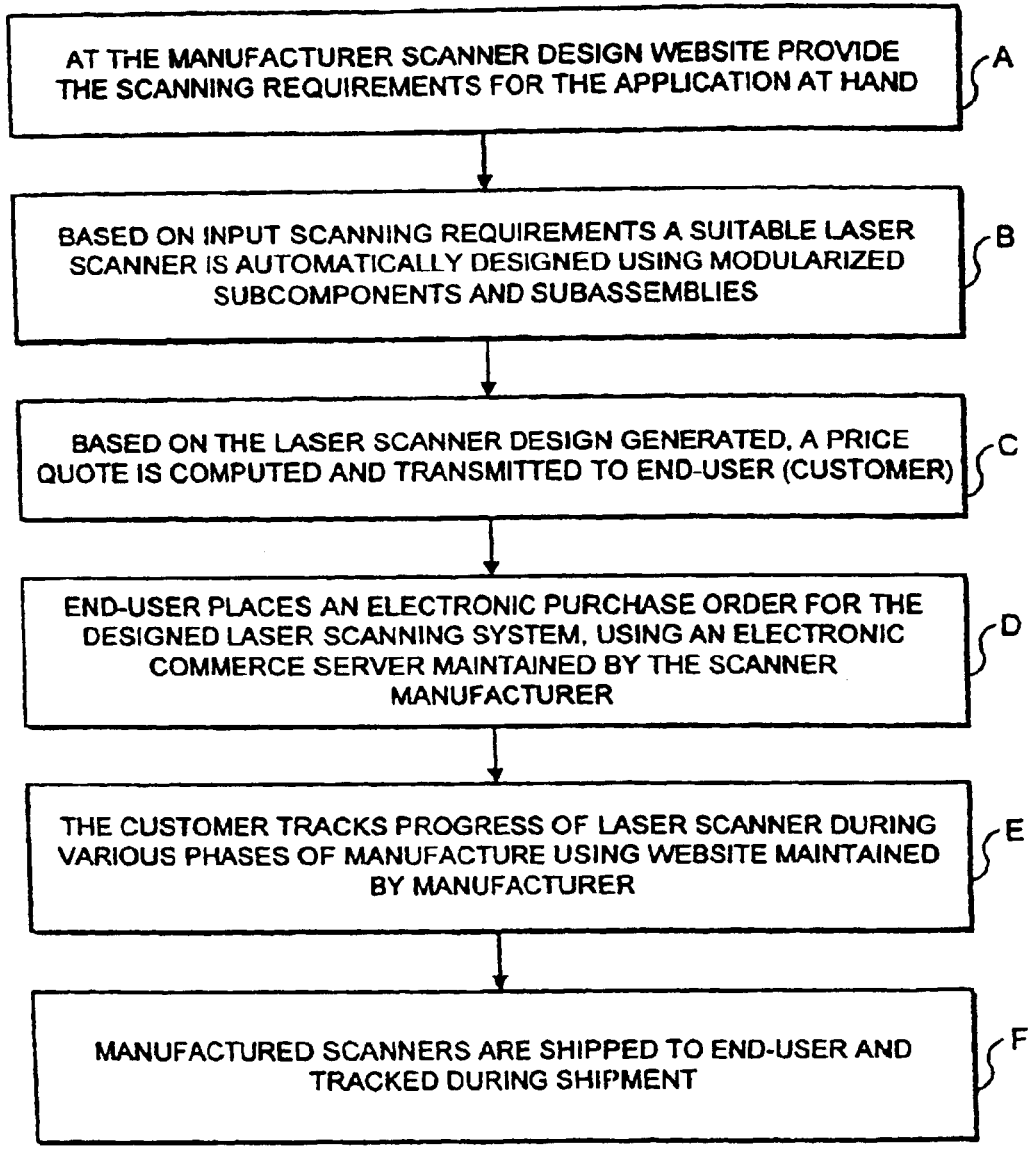
FIG. 3 is a method of designing, manufacturing and delivering custom-built laser scanners in accordance with the principles of the present invention.

As indicated at Block A in FIG. 3, the first step of the method of the present invention involves the end-user (e.g. prospective customer) using a client computer system 1 to access the Manufacturer's Website and to provide a specification of the end-user's scanning requirements, e.g.: the resolution of the smallest bar code element expected to be scanned; the speed at which bar codes are expected to move within the scanning field (or volume); the depth of the scanning field (or volume) required by the application; the dimensions of the scanning field (or volume) required by the application, etc. These parameters, as well as the e-mail address of the customer making the scanner design inquiry, are provided to the Database System 3 by way of HTML forms that are generated by CGI scripts running on the Web Server 2.

Figure 7:
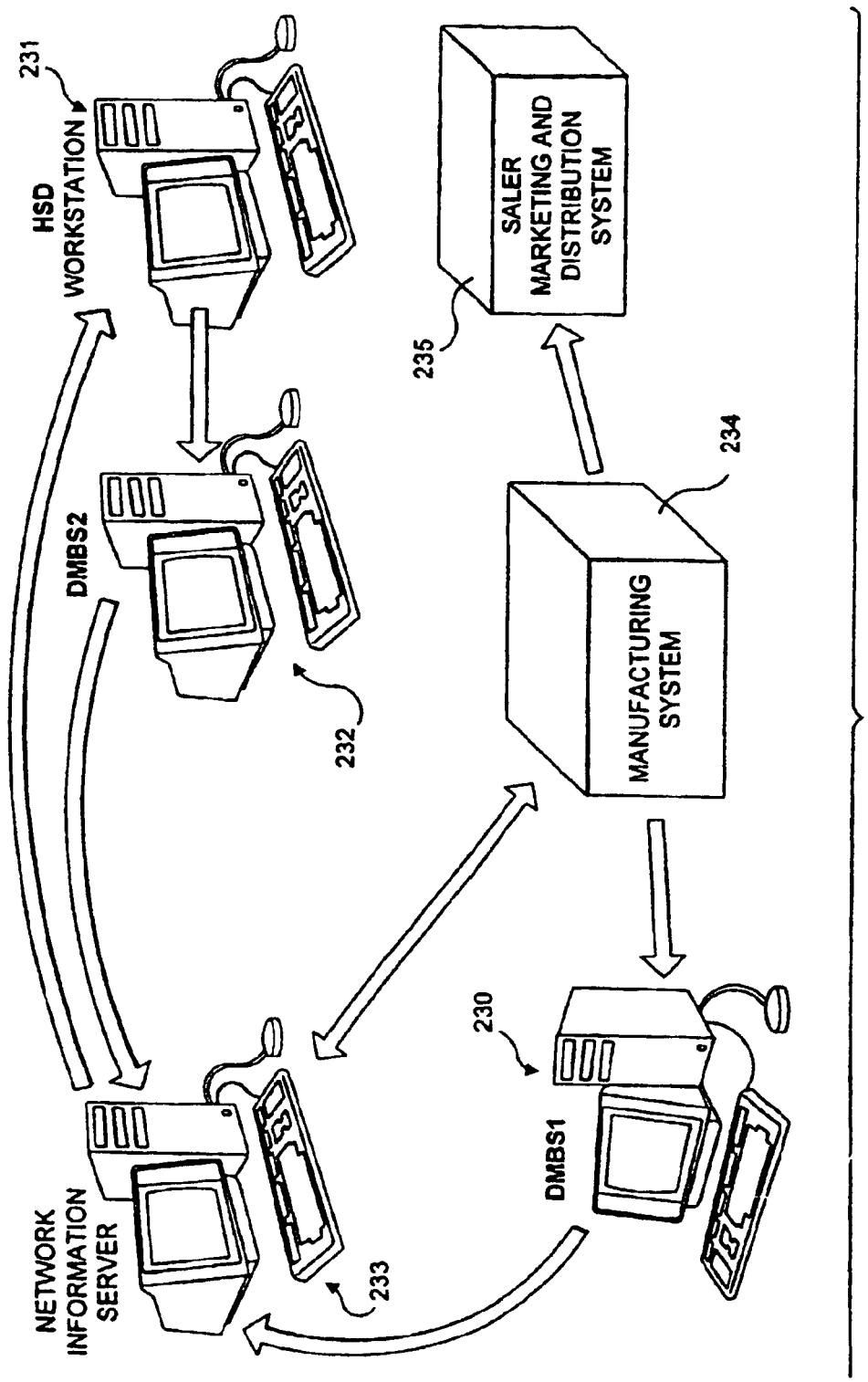
FIG. 7 is a more detailed schematic diagram of a Web-enabled (computer-integrated) system for designing and manufacturing modularized holographic laser scanning systems according to the principles of the present invention.

At indicated at Block B in FIG. 3, the second step of the method involves the Database System 3 using the information contained in these HTML forms, as well as the models and information contained therewithin, to generate a complete model of a laser scanner which will satisfy the end-user scanning requirements provided to the Database System Preferably, the scanner design process is completely automated by the Database System 3 and its automated design and testing procedures and therefore requires little or no input on part of optical engineers, in that all know-how, models, design procedures and the like are embodied with the scanner design programs running on Database System 3. Depending on various factors, design process could takes minutes or hours. It is understood, however, that one or more HSD workstations 231, as shown in FIG. 7, can be used to carry out scanner designs that are not automatable within Database System 3. Models of scanners, subcomponents, modules and subassemblies generated on workstations 231 during scanner design processes can be transferred to Database Management System (DBMS2) 232 for use within Database System 3, shown in FIG. 2. This aspect of the method hereof will be described in greater detail hereinafter.

Typically, Database System 3 will automatically carry out one or more scanner performance procedures on each scanner model generated in order to test whether the generated scanner design meets the scanning requirements set by the end-user. When it has determined that such scanning requirements are met by a particular design (sometimes requiring several reiterations), the Database System 3 then uses cost models, bill of material (BOM) lists, assembly schedules and the like, to arrive at a cost for a given quantity of the designed laser scanner product, as indicated at Block C in FIG. 3. Thereafter, the price quote along with its terms and conditions is transmitted to the e-mail address of the prospective customer who placed the Scanner Design Request. Each Scanner Design generated by the Database System 3 in response to a particular Scanner Design Request is assigned a unique Design Identification Number (DIN) so that future reference can be accurately made thereto by the Manufacturer and prospective customer alike. Optionally, the Manufacturer can provide the prospective customer with an access code enabling the prospective customer to view a complete 3-D computer-graphic simulation of the designed laser scanning system, generated from the Manufacturer's Web site and viewer by the prospective customer using a conventional browser program (e.g. Netscape Navigator or Microsoft Internet Explorer). The scanner simulation may be realized using Virtual Reality Modelling Language (VRML) or other suitable graphical display techniques particularly adapted for use over the Internet. Alternatively, scanner simulations can be recorded on CD ROM discs which can be sent to the prospective customer for analysis prior to purchase.

As indicated at Block D in FIG. 3, if satisfied with the delivered laser scanner design in the form of a computer-based model, the prospective customer (located anywhere in the world) may purchase the corresponding laser scanning system in accordance with the terms and conditions of the transmitted quote. This purchase can be carried out electronically by way of a secured electronic transaction supported by Electronic Commerce Server 4, shown in FIG. 2. All documentation relating to the purchase and delivery of the laser scanner order is carried out electronically using Web-enabled electronic data interchange (EDI) between the parties involved in the purchase transaction.

As indicated at Block E in FIG. 3, after the purchase order has been made, the customer may then track the progress of the laser scanning system order during the various stages of its manufacture. Such tracking can be carried out by way of HTML forms displayed from the Manufacturer's Web site. For example, each purchaser can be provided with a tracking number that can entered into a suitable HTML form displayed on a client system 1, requesting status information acquired by the manufacturing system 234 and supplied to Database System 3 or other server. The HTML form is sent to the Database System 3 (or other server) via a CGI in order to access up-to-date information on the status of the order (as well as portions thereof). The obtained information is then displayed by the browser of the customer seeking such status information.

As indicated at Block F in FIG. 3, when manufactured, tested and packaged, the laser scanners are shipped to the location specified by the customer, and during shipping, may also be tracked either by way of the Manufacturer's Website or by way of its shipping agent responsible for the delivery of the finished scanner product.

The process of acquiring user-specified scanning requirements, automatic/semi-automatic generation of laser scanner designs (i.e. models), electronic purchase of scanner product, tracking and the like can be realized using various technologies, including Javascript, well known in the Internet and Web arts.

In the illustrative embodiments, custom-design/built laser scanning systems are realized using holographic laser scanning mechanisms and high-speed scan data processors as taught in Applicant's International Application No. PCT/US96/20525, published under the Patent Cooperation Treaty as International Publication No. WO 97/22945, hereby incorporated herein by reference in its entirety. It is understood, however, that other non-holographic enabling technologies based on light reflection and/or refraction made be used to practice the present invention with acceptable results.

Figure 4:
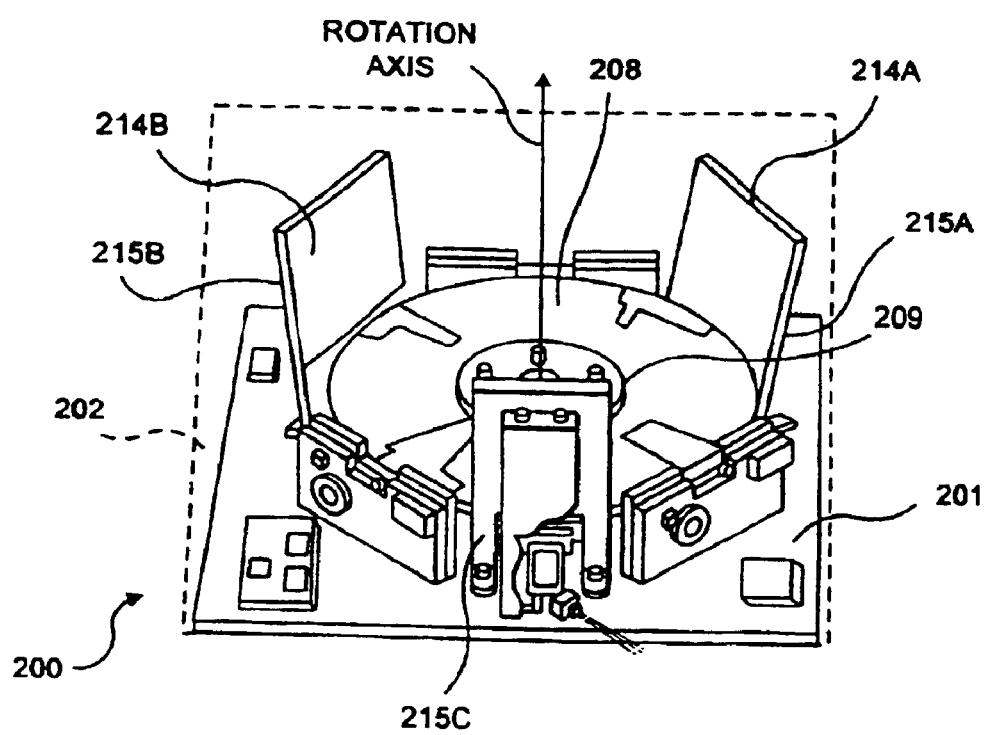
FIG. 4 is a perspective, partially cut-away view of an illustrative embodiment of a holographic scanning system constructed in accordance with the principles of the present invention, shown with its housing and the light detector support structure removed from its optical bench in order to reveal the modular design thereof exhibited by its holographic scanning disc, beam folding mirrors, laser beam production modules, analog/digital signal processing boards, and other structures otherwise hidden by the housing and the light detector support structure of the system.

One of the advantages of using holographic scanning technology to produce customized laser scanners is that one can easily generate 3-D scanning volumes and scanning patterns particularly tailored to a wide range of customer needs. Notably, the holographic laser scanner of modular construction shown in FIG. 4, and detailed in Applicant's International Application No. PCT/US96/20525, can be used to meet the needs of a wide class of customers quickly and in a highly cost-effective manner. Custom-designed (and built) laser scanners can be designed from this, as well as from other basic configurations, using the highly flexible scanner design method disclosed in International Application No. PCT/US96/20525). From this basic architecture, holographic laser scanners of modular design and construction having diverse scanning characteristics, matched to the end-user scanning requirements, can be rapidly designed and manufactured for shipment.

Figure 5:
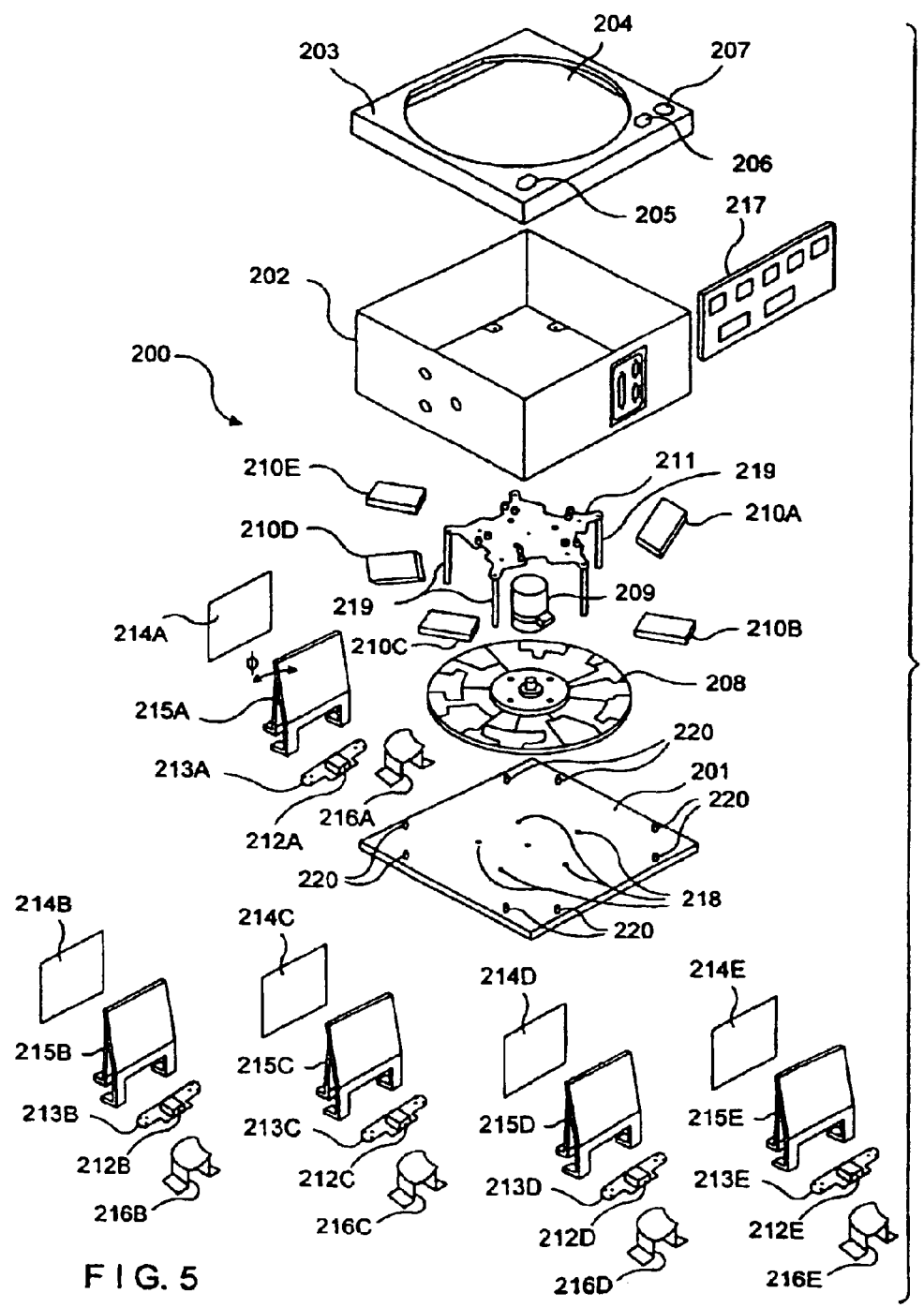
FIG. 5 is an exploded schematic diagram of an exemplary embodiment of a modularized holographic laser scanning system designed and being constructed according to the principles of the present invention.

In FIG. 5, an exemplary holographic laser scanner of modular construction 200 is shown comprising a number (i.e. six) of predesigned (preassembled) modules, namely: an optical-bench/housing module M1 comprising, as subcomponents, an optical bench 201, a wrap-around case 202 and a housing cover 203 with output scanning window 204, speaker 205 and LEDs 206 and 207; a holographic scanning-disc/photodetector module M2 comprising, as subcomponents, a holographic laser scanning disc 208, a scanning motor 209, photodetector/signal processing boards 210A through 120E, and a motor/board mounting assembly 211; a plurality of scanning station modules M3 comprising, as subcomponents, a laser beam production module 212A through 212E (for scan data channels A through E, respectively), base plate therefor 213A through 213E, output beam folding mirror 214A through 214E and adjustable support bracket 215A through 215E, and parabolic light collection mirror 216A through 216E, for mounting onto optical bench 201, adjacent to the corresponding base plate using a pair of screws of light fasteners; a digital signal processing and I/O module M4 comprising, as subcomponents, a CPU motherboard 217 with power supply, five CPUs for decode processing, I/O circuitry and the like.

In the illustrative embodiment, optical-bench 201 has a first set of preformed holes 218 for receiving the ends of support posts 219 associated with the motor/board mounting assembly 211, and a second set of preformed holes 220 for jointly mounting base plate 213 and adjustable support bracket 215. The size and dimensions of the optical bench will typically be selected to accommodate a holographic scanning disc having a maximum diameter (e.g., 8.66 inches). In such embodiments, scanning discs of smaller diameter (e.g., 6.0 inches or smaller) could be accommodated on such an optical bench, although the rationale for doing so, when a smaller size optical bench is available, is not certain. The size and dimensions of support bracket 215 are designed so that any one of a variety of output beam folding mirrors 214 can be mounted thereto using adhesive or the like in order to meet the specifications and performance characteristics of the holographic laser scanner under design. Optionally, optical bench 201 can have several sets of preformed mounting holes so that a different number of scanning-disc/photodetector modules M2 can be easily mounted to the optical bench, in order to provide the scanner designer with the option of designing various types of scanners having different number of output scan data channels, while using the same optical bench.

In the illustrative embodiment, a wrap-around case 202 can be made of metal, plastic or fiberglass and be available in a variety of heights (e.g., 4.0 inches, 5.0 inches, etc.) depending on the design at hand. The housing cover 203 is generally matched with the optical bench, and is designed to be used with a variety of cases of different height, as described above.

In some design applications, the holographic laser scanning disc 208 can be treated as a modularized component which is predesigned, premanufactured and available out of inventory for use in the design and construction of any particular scanner. In such instances, a number of predesigned/premanufactured scanning discs can be stored in inventory and used to construct various types of holographic scanner designs. While the laser beam scanning and light collection properties of each such inventoried scanning disc will remain substantially the same in each scanner in which it is employed, the resulting scanning volume and scanning pattern can be changed from design to design by using different modules and subcomponents, as will be explained in greater detail hereinafter.

It is also understood that in many applications, it will be desirable or necessary to custom design the holographic scanning disc using the fixed and variable parameters associated with the selected modules, subcomponents (e.g. pre-constructed "master" HOE-based scanning elements), and end-user design specifications. In such instances, the disc design methods and procedures described hereinabove can be used to design scanning systems having minimized height dimensions, omnidirectional scanning volumes, and the like.

By taking into account design parameters such as the minimum bar width to be read, the effective width of the scan pattern, the scan-line overlap, the overall depth of field, the maximum and minimum reading distances, the speed of the items passing through the scan region, etc., one can design a family of laser scanners based on a minimum number of holographic master scanning elements. By selecting the proper combination of these scanning elements, one can create a wide variety of scanners with a broad range of capabilities. Trade-offs can be made between depth of field and scan pattern repetition rate, for example; or between resolution and scan pattern repetition rate; or between scan pattern width and scan pattern repetition rate. etc. The trade-offs would be made to optimize the scanner for a particular customer's application.

Ideally, any combination of holographic facets with any combination of facet parameters is attainable using the design method of the present invention. For purposes of illustration, a suitable disc design method for producing an "XXBar" scan pattern using six scanning stations (i.e. VLDs) would involve first considering the broadest possible range of scanner requirements that must be satisfied or that one desires to satisfy. Thereafter, a number of holographic master facets (HOEs) are designed that will satisfy all of these requirements when used in the proper combinations. The number of facets required will, on the whole, be relatively small. While the 20 or so basic master holograms will be created using facet focal lengths, diffraction angles and areas established by the requirements of the scan pattern, the facet areas and the mirror angles and configurations in each individual scanner must be determined from the application requirements, using facet focal lengths and diffraction angles that are already established.

These master facets can be placed in a web, or in a master-facet source housing, in order to produce a master scanning disc for any particular design. The web is a circular array of apertures in which the master holograms are placed. The web is rotated so that each individual master hologram is placed at the proper location on the copy disk just prior to exposure. The master-facet source housing can be constructed as a large open container having individual cells containing the master facet holograms. A mechanical picking device can be used to select from the housing, the facet to be exposed at any particular time during the disc manufacture process. This facet would be placed by the picking element at the proper exposure position over the unexposed copy disk just prior to exposure.

The web approach is simpler and would be the preferred method when the number of master facets is reasonably small, 24 or less. The housing/picker approach is more complex but may be preferable when the number of master elements is much larger than 24. In both methods, the computer selects each individual master facet for each exposure of each facet on the copy disk. The selection is based on the particular design selected for the customer's application. No matter which method is used, some means must be provided for varying the size and shape of the facet on the copy disk. Therefore, some mechanism must be created to provide a variable mask for the copy exposure process.

Depending upon the design requirements, different scanning motors 209 (having different rotational speeds—RPMs—) can be selected for use in designing different types of holographic laser scanners. Photodetector/signal processing boards 210 (having different bandwidth characteristics, different analog signal processing thresholds, different signal gain constants, different SNR levels, etc.) can also be selected for use in designing different types of holographic laser scanners. The motor/board mounting assembly 211 attached to the optical bench selected (e.g., 8.66 or 6.00 inch scanning disc) like the casing 202 and housing cover 203.

In general, the adjustable support bracket 215 and base plate 214 upon which the laser beam production module is mounted, can be realized as a universal bracket subassembly that is utilizable in a very broad range of scanner designs, independent of the diameter of the scanning discs employed. It is understood, however, that it will be desirable to design, make and inventory many different laser beam production module designs for use in different kinds of holographic scanning systems under design. Such laser beam production modules can be designed to produce stigmatic laser beams having widely different aspect ratios, and focal distances for use in different scanner designs in order to meet the operational and performance characteristics thereof, including, for example: the resolution of the smallest bar code element expected to be scanned; the speed at which bar codes are expected to move within the scanning field (or volume); the depth of the scanning field (or volume) required by the application (e.g. scanning distance); the dimensions of the scanning field (or volume) required by the application (i.e. scanning volume characteristics); scanning beam aspect ratio; scanning beam polarization-state; specified code symbol resolution at a specified scanning distance(s); bar code substrate characteristics and print quality characteristics; and the like.

Preferably, the parabolic mirror 216 associated with each scanning station module M3 is directly mounted to the optical bench by a pair of screws of like fasteners. This component will be designed to satisfy the light collection requirements of the widest holographic facet on the largest diameter scanning disc able to be accommodated by the selected housing, and while utilizing the minimum amount of space possible therebeneath. Once designed and manufactured, the focal length of the parabolic mirror will be fixed, determining where the corresponding photodetector board must be positioned above the scanning disc. While it is possible to design, make and inventory a number of parabolic mirrors having different light collection surface areas and focal lengths, it may be desirable in many applications to stock a single parabolic mirror design. In such a case, the parabolic mirror subcomponent will be matched to the motor/board mounting assembly 211 and the support posts 219 which depend therefrom.

From the point of design flexibility, it would be desirable to use a single output mirror design having the largest possible width and height dimensions. However, this approach certainly has its drawbacks. Thus, in many instances, it will make sense to elect an output mirror having different height and width characteristics for use in a particular scanner design. By doing so, the scanner designer will be able to minimize manufacturing costs and overall scanner weight, while increasing the total available volume within the scanner housing for the internal mounting of auxiliary components.

An important feature of the mirror support bracket 215 is that it is provided within a hinge or like mechanism that allows the plane of the mirror to be adjusted with respect to the optical bench. As shown in FIG. 5, the adjustable mirror support bracket allows the scanner design parameter $\phi$ to be a variable in the custom disc design process of the present invention. In geometrical terms, this support bracket assembly allows the output mirrors to be reconfigured (e.g., tilted) in any given system design so as to achieve 3-D scanning pattern and light collection characteristics required by the scanning system specified by the end user.

Preferably, a number of different digital signal processing and decode boards 217 would be designed, manufactured and inventoried in order to satisfy the scanner design requirements for a wide range of applications. Certain boards would support three CPUs, while other boards support five or more CPUs. Some boards could be provided with special decoding algorithms, I/O interfaces, low-speed scanner input options, and the like.

Figure 6:
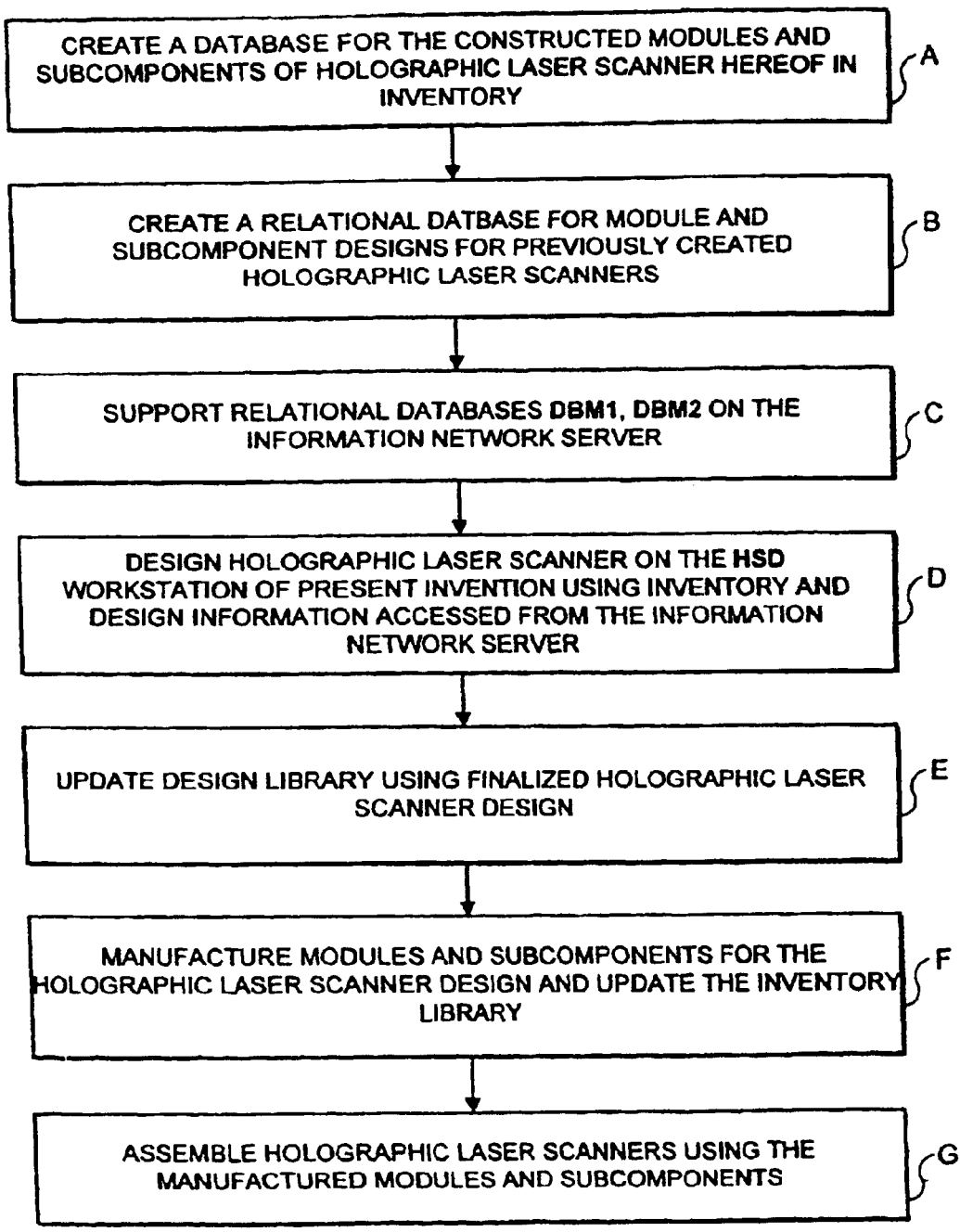
FIG. 6 is a high level flow chart illustrating the stages of designing and manufacturing modularized holographic laser scanners according to the principles of the present invention.

In accordance with another aspect of the present invention, these basic modules and subcomponents are used in conjunction with the computer-integrated design and manufacturing system shown in FIG. 6 in order to efficiently design and inexpensively manufacture a wide range of holographic laser scanners having performance characteristics uniquely tailored to the needs of particular end-users.

As shown in FIG. 6, the system of the present invention is realized as a network of computer systems comprising: a first database management system (BDBMS1) 230 for storing and managing information model relating to the inventory of modules, submodules (subcomponents) available within the system; one or more holographic scanner design (HSD) computer workstations 231 for designing holographic laser scanners, subsystems and subcomponents thereof according to the principles of the present invention; a second database management system (DBMS2) 232 for storing and managing information models (e.g., 2-D, 3-D geometrical models, geometrical optics models, analytical models, etc.) about modules and subcomponent designs obtained from the HSD workstations; a network information server (computer system) 233 for storing and serving the database information models (comprises of information files of various sorts) maintained by DMS1 and DBMS2 so that other computer systems within network can access such models whenever needed; and a system 234 for manufacturing holographic laser scanners using the designs and models stored in the network information server 233. Holographic laser scanners manufactured using the CIM system hereof are then sold and distributed using a sales, marketing and distribution system 235 of the manufacturer's choice. Each of these computer-based systems can be located at different locations throughout the world, and thus could be interconnected by way of a wide area network (WAN) such as the Internet. If the systems are located in close proximity, then they could be interconnected by a local area network (LAN), depending on the needs of the manufacturer. In the illustrative embodiment, each of the computer systems in the network supports the Windows NT Operating System (OS) by MicroSoft Corporation, of Redmond, Calif., and the network protocol TCP/IP.

Notably, information files maintained with database systems 232 and 230 that are required for scanner design generation (at the Manufacturer's Web site) are made available to Database System 3 shown in FIG. 2, by way of network server 233 shown in FIGS. 2 and 7. In the illustrative embodiment, network server 233 is realized as an ftp server and is connected to an ISP 3 for Web-enablement and selected information file sharing over the Internet using, for example, file transfer protocol (ftp).

The relational database management systems DBMS1 and DBMS2 can be realized using a commercially available relational database system development program such as, for example, 4D Version 6.0 from ACI US, Inc., Access™ from MicroSoft Corporation, SQL from Sybase, Inc., etc. The function of DBMS1 is to maintain an "Inventory Library" that tracks and manages the inventory of manufactured modules and subcomponents that have been either placed into inventory or removed therefrom to satisfy production requirements. Bar code indexing/tracking techniques can be used to carry out this subsystem in a manner well known in the part inventory management art. The function of DBMS2 is to store and manage module and subcomponent designs that have been previously designed in connection with other holographic scanner designs that may or may not have ever been manufactured.

The HSD workstations 231 can be realized in the manner described in great detail hereinabove. In connection therewith, it should be noted that HSD workstations used in the design of the mechanical components of the holographic scanners will have 3-D CAD modelling tools (e.g., AUTOCAD) well known in the art.

The manufacturing system 234 will typically include CNC machine tools, robots, pick-and place machines, assembly fixtures, assembly lines, and the like. While structures, elements and processes are generally well known in the art, they will expectedly vary from embodiment to embodiment of the system hereof. Notwithstanding this fact, the subsystems thereof will be generally configured in accordance with the requirements of the designs provided by the HSD workstations described above.

In FIG. 6, a generalized method of designing and manufacturing holographic laser scanners using the Web-enabled CIM system of the present invention is illustrated. As indicated at Block A thereof, the first stage of the method involves using DBMS1 to create a relational database model (i.e. DBM1) for constructed laser scanner modules and subcomponents available in inventory. The second stage of the method involves using DBMS2 to create a relational database model (i.e. DBM2) for laser scanner modules and subcomponent designs that have been previously created during the design of other holographic laser scanners. Notably, DBM2 provides the Design Library with geometrical models, geometrical-optical models, and/or analytical models of modules and subcomponents of holographic laser scanners of modular construction. The third stage of the method involves maintaining mirror images of the relational database models DBM1 and DBM2 on the Information Network Server 233. By doing so, each HSD workstation and manufacturing workstation and computer system within the manufacturing system is provided access to the information stored therein over the global information network, as needed or desired.

As indicated at Block D, the next stage of the method involves designing a holographic laser scanner on one or more HSD workstations using inventory and design information stored on the Information Network Server. In this alternative embodiment of the design process of the present invention, each HSD work station is preferably provided with several computer-software "tools" that facilitate the design of holographic laser scanners of modular construction, namely: an Inventory Display Tool (e.g., client program) for displaying which modules and subcomponents are available in the Inventory Library, in what quantities, at what cost, etc,; a Design Display Tool (e.g., client program) for displaying which module designs and subcomponent designs have been previously created and are available for downloading from the Information Network Server; and a Module/Subcomponent Selection Tool (e.g., client program) for selecting which modules and subcomponents in Inventory Library DBM1) or from the Design Library (DBM2) will be used in designing a holographic laser scanner of modular construction.

When the Database System 3 (or scanner designer) uses the Module/Subcomponent Selection Tool, a Holographic Scanner Design Tree Structure as shown in FIG. 7 is analyzed by Database System 3 (or displayed on the graphical user interface (GUI) of the HSD workstation for analysis by the scanner designer). Underlying this graphical tree structure is an information structure (e.g., relational database model) that stores the various information files associated with each of the modules and submodules (I.e., subcomponents) of the "modularized" holographic laser scanner under design. This structure can be viewed as a "System Model" for the holographic scanner under design. While each holographic laser scanner will have generally the same system architecture, the particular modules and subcomponent structure thereof can and will vary from scanner design to scanner design. The subcomponent structure of a given design will depend on which modules and subcomponents selected during the design process. The Database System 3 (or scanner designer) can access the Network Information Server 233 and use the Inventory Display Tool to determine which particular modules and submodules (subcomponents) are in the manufacturer's inventory, what the present cost of their manufacture is, their availability, etc. The Database System 3 (or holographic scanner designer) can access the Network Information Server 233 and use the Design Display Tool to determine which particular modules and subcomponents have been previously designed during previous scanner design projects, that may be useful in the present design.

When the Design Display Tool is launched from Database System 3 (or HSD workstation 231), information models of the modules and subcomponents in the DBM2 can be reviewed and analyzed. An exemplary display screen is set forth in FIG. 8. In this display screen, the modules of a previous scanner design ("Design A") are indicated by M1A, M, M3A and M4A. The subcomponents of module M1A are indicated by M1A1, M1A2, M1A3, and M1A4. The subcomponents of module M are indicated by M1, M2, M3, M4, and M5. The subcomponents of module M3A are indicated by M3A1, M3A2, M3A3, and M4A4. While not shown in this display screen, each subcomponent contains detailed information about its design, specifications and performance characteristics which can be readily displayed by simply clicking on the display cell associated with the subcomponent. Understandably, the graphical user interface of this design tool (i.e., program) will vary from embodiment to embodiment of the present invention.

Based on the specifications and expected cost of the module designs displayed using the Design Disciple Tool, the Database System 3 (or scanner designer) can determine which designs are best suited for use in the present scanner design project. When the Database System 3 (or scanner designer) finds a certain module or subcomponent satisfactory to the design requirements, then the module or subcomponent can be selected as follows: (1) employing the Design Display Tool (or its functional equivalant) to select the module or subcomponent design from the Design Library (e.g., by "clicking on" the graphical icon thereof); (2) constructing/generating the Holographic Scanner Design Tree Structure; (3) "dragging" the selected icon of the module or subcomponent design over to the Holographic Scanner Design Tree Structure; and (4) "dropping" it onto the module or subcomponent location of the Tree Structure where the selection is to be achieved. Each time such a drag and drop operation is carried out (manually by scanner designer, or in an automated manner by Database System 3), the diverse information files associated with the selected module or subcomponent are automatically transferred from the Internet Network Server 233 to the information structure underlying the Holographic Scanner Design Tree Structure (stored in either the HSD workstation or Database System 3, as the case may be).

When the Inventory Display Tool is launched, information models of the modules and subcomponents in the DBM1 can be reviewed.

Figure 8:
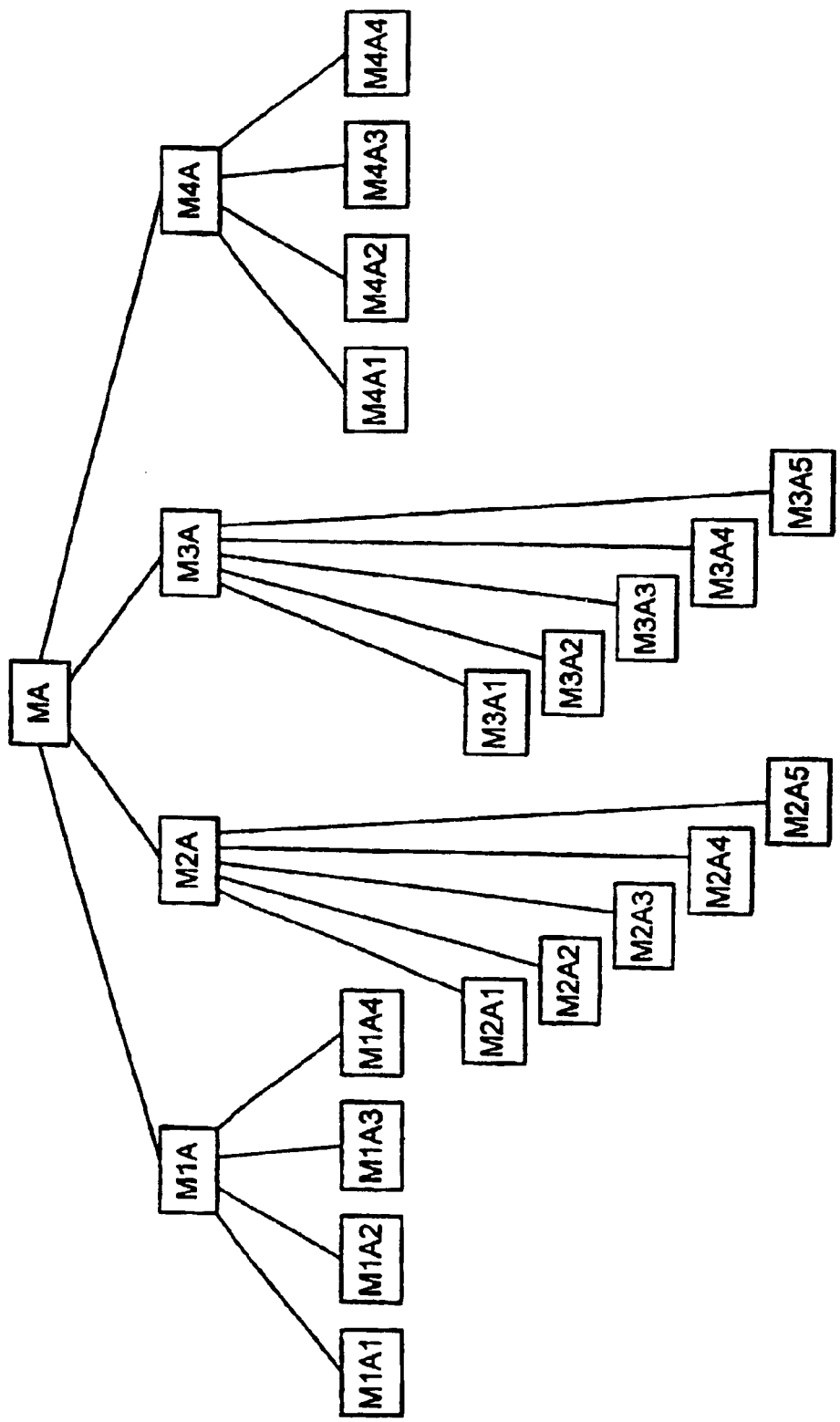
FIG. 8 is a schematic representation of a tree-type information structure used to display which modules and sub-components have been selected from Inventory Library or the Design Library of the Web-enabled system during the design of the modularized holographic laser scanners according to the principles of the present invention.

Preferably, to provide a unified approach to the scanner design process, the display screen shown in FIG. 8 is also used to display inventoried modules and subcomponents. However, to distinguish between module and subcomponent designs in the Design Library from manufactured modules and subcomponents in Inventory Library, graphical indications (or color coding techniques) should be employed to make clear what modules and subcomponents are in the Inventory Library and what modules and subcomponents are only in the Display Library (and not manufactured). Alternative techniques for displaying such models will occur to those skilled in the art upon having the benefit of the present disclosure.

Based on specifications, availability, and actual cost figures for the modules and subcomponents displayed using the Inventory Display Tool, the scanner designer can determine which designs are best suited for use in the present scanner design project, in a manner described hereinabove. When the designer finds a certain module or subcomponent satisfactory to the design requirements, then module or subcomponent selection can occur as follows: (1) employ the Inventory Display Tool (or its functional equivalent) to select the module or subcomponent design from Inventory database system DBMS1 (e.g., by "clicking on" on the graphical icon thereof); (2) generate the Holographic Scanner Design Tree Structure; (3) "drag" the selected icon of the module or subcomponent design over to the Holographic Scanner Design Tree Structure; and (4) "drop" it onto the module or subcomponent location of the Tree Structure where the selection is to be achieved. Each time such a drag and drop operation is carried out (manually by scanner designer, or in an automated manner by Database System 3), the diverse information files associated with the selected module or subcomponent are automatically transferred from the Internet Network Server to the information structure underlying the Holographic Scanner Design Tree Structure (stored in either in the HSD workstation or Database System 3 as the case may be).

Using the Design and Inventory Display Tools, in conjunction with the Holographic Scanner Design Tree Structure of the present invention, a basic model for the holographic laser scanner under design can be arrived at with minimum effort. Notably, however, not all of the subcomponents can be selected during this stage of design if one desires to optimize the scanner design in the various ways described in International Application No. PCT/US96/20525. In such cases where optimization is desired, it will be necessary to defer the selection of particular subcomponents (e.g., the housing casing which determines the height of the scanner; the beam folding mirrors which also determine the height of the scanner housing; etc.) until the design process is completed. The basic model would have a number of fixed scanner parameters set by the selection of the particular modules and subcomponents. Other parameters will be set by the designer based on Heuristics and experience. The variables in the system design can be determined by employing the geometrical and analytical modelling techniques hereinbefore described to arrive at optimized values for such system variables. Once these parameters have been determined, the designer can go back to the Information Network Server 233 and select subcomponents that satisfy the optimized parameters. Thereafter the Database System 3 (or scanner designer) can update the Holographic Scanner Design Tree Structure (i.e., scanner system model) and thus, the model of the scanner under design. At the end of the design process, a complete set of construction parameters will have been generated for use in manufacturing "optimized" holographic scanning discs in a manner described hereinabove.

As indicated at Block E, after the holographic scanner design has been finalized, the information models comprising the same can be used to update the Design Library (DBM2) as required, thereby increasing the design capabilities of the system.

At Block F, the modules and subcomponents (e.g., scanning disc) are manufactured according to the finalized holographic scanner design. Then based on production activity, the module and subcomponent Inventory Library (DBM1) is periodically updated to track the status of the manufacturer's inventory.

As indicated at Block G, the finalized holographic laser scanner design is assembled, its parameters configured, and its performance tested as described hereinabove.

In the design process described above, the holographic scanning disc was considered a subcomponent characterized by having several variables that are determined by application of the design procedures of the present invention. It might be desirable, however in some applications, to pre-design and inventory a number of scanning disc designs for selection during the design process, much like the parabolic light collection mirror, subcomponent M3A3, in the display screen of FIG. 8. In other embodiments, it will be preferable to custom design the HoEs on the holographic scanning disc, in order to exploit the advantages of the various design optimization procedures disclosed herein. However, even in such embodiments, the size of the scanning disc plates (e.g., 8.66 or 6.00 inches in diameter) will be a subcomponent that the designer will necessarily select during the preliminary design stage of the design process for modularized holographic scanners using the Inventory and Design Library databases described above.

In other embodiments, it will be preferable to custom design the entire holographic scanning system in order to meet the specifications and requirements of a particular end user.

While the various embodiments of the laser scanner hereof have been described in connection with linear (1-D) and 2-D code symbol scanning applications, it should be clear, however, that the scanning apparatus and methods of the present invention are equally suited for scanning alphanumeric characters (e.g., textual information) in optical character recognition (OCR) applications, as well as for scanning graphical images in graphical scanning arts.

Several modifications to the illustrative embodiments have been described above. It is understood, however, that various other modifications to the illustrative embodiment of the present invention will readily occur to persons with ordinary skill in the art. All such modifications and variations are deemed to be within the scope and spirit of the present invention as defined by the accompanying Claims to Invention.

What is claimed is:

1. An Internet-enabled method for designing and purchasing an optical code reading system, comprising the steps:
    (a) hosting on a programmed Internet information server, a Website capable of supporting an interactive procedure;
    (b) using a client computer system having a Web browser program, to enable a prospective customer to transmit end-user system specifications for a particular optical code reading system, to said Website during said interactive procedure;
    (c) assigning a unique customer request number to said prospective customer;
    (d) designing an optical code reading system based on said transmitted end-user system specifications; and
    (e) computing a price quotation based on a finalized design for said optical code reading system.

2. The Internet-enabled method of claim 1, which further comprises:
    (f) transmitting said price quotation to said prospective customer of said optical code reading system.

3. The Internet-enabled method of claim 2, which further comprises:
    (g) using an electronic commerce server for supporting secured electronic commerce transactions and enabling said prospective customer to electronically transmit a purchase order on said finalized design for said optical code reading system.

4. The Internet-enabled method of claim 3, which further comprises:

(h) enabling said perspective customer to track the progress of said ordered optical code reading system during its various stages of manufacture using said Website.

5. The Internet-enabled method of claim 1, wherein said end-user system specifications are satisfied by said finalized design comprising models of modularized subcomponents and subassemblies.

6. The Internet-enabled method of claim 1, wherein said optical code reading system is a bar code reading system.

7. An Internet-based method of designing an optical code reading system comprising the steps:

(a) using a client computer system to access a manufacturer's Website and providing to said manufacturer's Website a specification of an end-user's requirements; and (b) using said specification to generate a model of a designed optical code reading system which satisfies said end-user's requirements, said model generation involving the use of a bar code scanner design workstation and database management system containing a library of design specifications for predesigned modules and subcomponents of one or more previously designed optical code reading systems.

8. The Internet-based method of claim 7, which further comprises:

(c) using said generated model to compute a price quotation for a given quantity of said designed optical code reading system, and transmitting said price quotation along with its terms and conditions to a prospective customer.

9. The Internet-based method of claim 7, which further comprises:

providing said prospective customer with an access code enabling the prospective customer to view a complete 3-D computer-graphic simulation of the designed optical code reading system, generated from said manufacturer's Website and viewable by the prospective customer using a Web browser program.

10. The Internet-enabled method of claim 8, which further comprises:

purchasing said designed optical code reading system using an electronic commerce transaction process supported by an electronic commerce server.

11. The Internet-based method of claim 10, which further comprises:

providing said prospective customer with a CD ROM disc whereon is recorded a computer-graphic simulation of said model of said designed optical code reading system.

12. The Internet-enabled method claim 7, wherein said optical code reading system is a bar code reading system.

13. An Internet-enabled system for designing an optical code reading system comprising:

an Internet information server for hosting a Website; and a client computer system for accessing said Website and providing thereto a specification of an end-user's requirements for an optical code reading system;

wherein said Internet information server uses said specification to generate a model of an optical code reading system design which satisfies said end-user's requirements.

14. The Internet-enabled system of claim 13, which further comprises:

a computer system for computing a price quote for a given quantity of product based on said bar code scanning system design, and using said Internet information server to transmit said price quote along with its terms and conditions to a prospective customer.

15. An Internet-enabled system of claim 14, wherein said Internet information server provides said prospective customer with an access code enabling the prospective customer to view a complete 3-D computer-graphic simulation of the optical code reading system design, generated from said Website and viewable by the prospective customer using a Web browser program.

16. The Internet-enabled system of claim 14, which further comprises:

means for providing said prospective customer with a CD ROM disc whereon is recorded a computer-graphic simulation of said optical code reading system design.

17. The Internet-based system of claim 14, which further comprises:

means for purchasing said product-based on said optical code reading system design using an electronic commerce transaction supported by an electronic commerce server.

18. The Internet-enabled method of claim 13, wherein said optical code reading system is a bar code reading system.

* * * * *